United States Patent [19]

Jones

[11] Patent Number: 4,811,919

[45] Date of Patent: Mar. 14, 1989

[54] VOLUME COMPENSATED FLUID MOUNT

[75] Inventor: Peter J. Jones, Erie, Pa.

[73] Assignee: Lord Corporation, Erie, Pa.

[21] Appl. No.: 83,435

[22] Filed: Aug. 6, 1987

[51] Int. Cl.$^4$ .............................................. B64D 27/26
[52] U.S. Cl. ...................................... 244/54; 248/557; 267/140.1
[58] Field of Search .............................. 244/53 R, 54; 267/140.1, 219; 248/556, 557, 562, 566, 613, 621, 631, 636

[56] References Cited

U.S. PATENT DOCUMENTS

| | | | |
|---|---|---|---|
| 3,107,752 | 10/1963 | McLean | 188/87 |
| 3,807,678 | 4/1974 | Karnopp et al. | 248/358 |
| 4,384,700 | 5/1983 | Thompson et al. | 248/550 |
| 4,416,445 | 11/1983 | Coad | 267/219 |
| 4,613,118 | 9/1986 | Morita | 248/562 |

FOREIGN PATENT DOCUMENTS 2906282 8/1980 Fed. Rep. of Germany .
3245653 6/1984 Fed. Rep. of Germany ... 267/140.1
2394715 1/1979 France ............................... 267/219

Primary Examiner—Galen Barefoot
Assistant Examiner—Rodney Corl
Attorney, Agent, or Firm—Philip P. McCann; James W. Wright

[57] ABSTRACT

A fluid mount particularly suited for mounting an engine in an aircraft. The mount includes a frame which is fastened to the engine and a support movably mounted in the frame and adapted to receive a wing pylon stub shaft. Opposed liquid-filled chambers are provided on opposite sides of the stub shaft support and are fluidly interconnected by an elongate tube. An auxiliary chamber is provided on the frame adjacent to the upper liquid chamber and is divided internally into a gas-filled portion and a liquid-filled portion which is in communication with the upper liquid chamber via an orifice. The auxiliary chamber accommodates changes in liquid volume without adversely affecting either the static or dynamic performance of the mount.

20 Claims, 2 Drawing Sheets

VOLUME COMPENSATED FLUID MOUNT

FIELD OF THE INVENTION

The present invention relates to fluid-filled mounts, and more particularly, the present invention relates to fluid-filled aircraft engine mounts.

BACKGROUND OF THE INVENTION

In certain aircraft, turbine engines are mounted to pylons depending from the aircraft wings. Generally, fore and aft mounts and related structures connect the engine to the pylon in a manner that accommodates a variety of engine mounting requirements. In one known type of forward engine mounting arrangement, a stub shaft extends forwardly from the wing pylon and is received in a bore in a bulkhead bearing plate carried at the upper front end of the engine. The engine is thereby firmly connected to the wing pylon.

While the aforementioned mounting structure may function satisfactorily to connect the engine to the wing pylon, it is less than desirable because the direct metal-to-metal interconnection permits engine noises and lower frequency vibrations to be transmitted into the interior of the aircraft via the pylon and related wing structure. Engine noise and lower frequency vibration transmission can be reduced by providing a soft elastomeric connection between the stub shaft and engine. A soft connection is undesirable, however, because it can create engine whirl and flutter vibration problems.

Fluid-filled mounts have been used in a variety of applications, including the mounting of engines to frames in land vehicles, such as automobiles. Such mounts generally include a pair of opposed variable volume fluid-filled chambers separated by an elongate inertia track passageway which provides a fluid mass of a desired configuration that enables the mount to be designed, or tuned, to provide desirable dynamic operating characteristics. There are essentially two kinds of fluid mounts: a so-called single pumper type and a so-called double pumper type.

In a single pumper fluid mount, one of the chambers has a high volume stiffness relative to the other. In such a mount, changes in the volume of the fluid due to various factors, including changes in ambient temperature, are accommodated by changes in the volume of the chamber having the lower volume stiffness. In a double pumper type of fluid mount, both opposed fluid-filled chambers have a relatively high volume stiffness (in excess of about 100 psi. per cubic inch) to provide certain desirable dynamic operating characteristics. While this type of fluid-filled mount can be made relatively stiff so that it could avoid the aforementioned whirl and flutter problems, and provide a fluid tuned mass absorber effect at operating frequency, it has certain disadvantages in that changes in the volume of the fluid in the chambers, such as may be caused by variations in ambient temperature, can cause significant changes in working fluid pressure, thereby adversely affecting the performance of the mount. Changes in fluid volume can also be caused by migration of the fluid into the elastomeric material forming the flexible walls of the chambers. When this occurs, the desired volume stiffness is lost, and mount performance is adversely affected.

Fluid-filled mounts for various applications have been sold by the assignee of the present application under the trademark FLUIDLASTIC. While the fluid-filled mounts have found increasing usage in a variety of applications such as the automotive engine mounting applications discussed above, and to some extent in helicopter pylon mounting applications, their use in aircraft engine mounting applications is limited by the need to accommodate the aforementioned changes in volume of working fluid in the opposed chambers in response to the wide range of variations in ambient temperature encountered by modern turbine powered aircraft. Heretofore, a satisfactory fluid-filled mount capable of meeting the aforementioned turbine engine mounting requirements has not been available.

An attempt has been made to provide a vibration isolator capable of accommodating changes in volume of a working fluid due to changes in ambient temperature. Such a structure is described in U.S. Pat. No. 3,107,752 issued to the assignee of the present application. U.S. Pat. No. 4,613,118 and German published application No. DT 906282 both disclose so-called single pumper fluid mounts wherein changes in fluid volume are accommodated by changes in the volume of the chamber having the lower stiffness. U.S. Pat. No. 4,384,700 discloses an hydraulic system for damping movement of a vehicle seat by incorporating within the system an air precharged accumulator chamber. U.S. Pat. No. 3,807,678, also owned by the assignee of the present application, discloses a fluid system having an accumulator chamber which is connected to a main fluid system via valving means.

OBJECT OF THE INVENTION

With the foregoing in mind, a primary object of the present invention is to provide a novel fluid-filled mount which can accommodate readily changes in its fluid volume without adversely affecting the performance of the mount.

Another object of the present invention is to provide an improved fluid-filled mount which is particularly suited for use in mounting engines in aircraft.

A further object of the present invention is to provide a volume compensated fluid-filled double pumper type aircraft engine mount which operates satisfactorily over a wide range of ambient temperatures to attenuate engine noises and vibrations which otherwise would be transmitted into the cabin of the aircraft.

SUMMARY OF THE INVENTION

More specifically, the present invention provides a volume compensated fluid-filled double pumper type mount particularly suited for attaching a turbine engine to a wing pylon of a multi-engine aircraft. The mount includes a frame which is fastened to the engine and a movable support in the frame that receives a forwardly extending stub shaft on the wing pylon. A pair of opposed variable volume working fluid chambers are provided on upper and lower sides of the support in the frame and are in fluid communication with one another via an elongate passageway external of the frame. Laminated elastomeric elements resiliently secure the stub shaft support in the frame and provide the opposed fluid chambers. The fluid chambers cooperate with the fluid passage therebetween to define a primary fluid system each chamber of which has a predetermined volume stiffness. Volume compensation for the primary fluid system is provided by an auxiliary chamber which is divided internally by a diaphragm into a gas-filled portion and a fluid-filled portion providing a secondary fluid system in fluid communication with the primary fluid system via an orifice. The volume stiffness of the secondary fluid system is lower than the volume stiffness of either chamber of the primary fluid system. At certain operating frequencies, fluid resistance across the orifice cooperates with the resonating fluid slug contained within the orifice to isolate dynamically the secondary fluid system from the primary fluid system while accommodating static changes in the volume of the fluid in the primary fluid system and having negligible effect on the overall stiffness of the mount.

BRIEF DESCRIPTION OF THE DRAWINGS

The foregoing and other objects, features and advantages of the present invention should become apparent from the following description, when taken in conjunction with the accompanying drawings, in which.

DESCRIPTION OF THE PREFERRED EMBODIMENT

Figure 1:
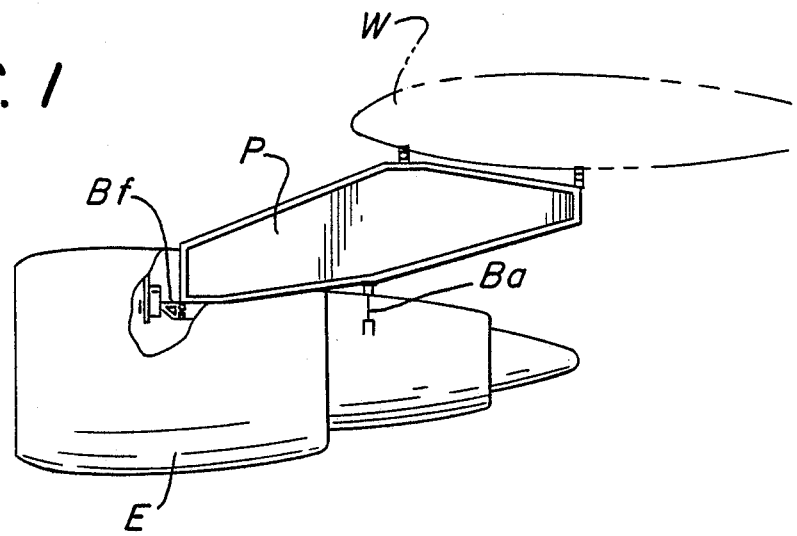
FIG. 1 is a side elevational view in reduced scale of a turbine engine mounted to a pylon dependening from an aircraft wing, the engine cowling being partially broken away to expose the forward engine mount which embodies the present invention.

Referring now to the drawings, FIG. 1 illustrates in phantom lines the wing W of an aircraft extending laterally outward from the fuselage thereof which contains the passenger cabin (not shown). A pylon P depends below and extends forwardly of the leading edge of the wing W for mounting thereto an engine E, such as a high bypass turbofan engine. The engine E is secured to the wing pylon P by fore and aft engine mounting bracket assemblies $B_f$ and $B_a$, respectively. The present invention relates to the structure of the forward mounting bracket assembly $B_f$.

In the conventional turbine engine mounting arrangement, a stub shaft 10 extends forwardly from a beam 11 secured to the underside of the wing pylon P. The engine E has a vertical transverse bulkhead 12 with a bore receiving a bearing sleeve 13. In the conventional turbine engine mount, the stub shaft 10 is slidably received within the bore of the sleeve 13, thereby permitting the weight of the forward end of the engine E to be carried by the stub shaft 10 and thereby to be transferred to the wing pylon P. Thrust loads are carried by conventional thrust links (not shown). A stop 14 is threaded onto the forward end of the stub shaft 10 as a back-up in the event of failure of other load carrying elements.

In the conventional forward turbine engine mount, the aforedescribed metal-to-metal bearing connection provided between the bulkhead sleeve and pylon stub shaft provides a stiff suspension system that prevents unacceptable whirl and flutter conditions from developing. However, the stiff bearing connection is undesirable because it permits excessive 60 Hertz vibrations to be transmitted into the aircraft cabin, thereby generating unacceptable vibration and noise levels therein. While a soft bearing connection would solve the noise problems, it could create whirl and flutter problems.

The present invention solves the aforementioned problems by providing a so-called double pumper fluid mount between the wing pylon stub shaft and the engine bulkhead bearing sleeve. The mount provides a desirable high stiffness over a broad low frequency range (1 to 40 Hertz) to control whirl and flutter vibrations but has a minimum stiffness at about 60 Hertz to minimize sound transmission into the aircraft cabin via the wing pylon P. Moreover, the fluid mount of the present invention operates satisfactorily even when installed in modern aircraft that undergo significant changes in ambient temperature with altitude by accommodating the resulting variations in the volume of the fluid.

Figure 2:
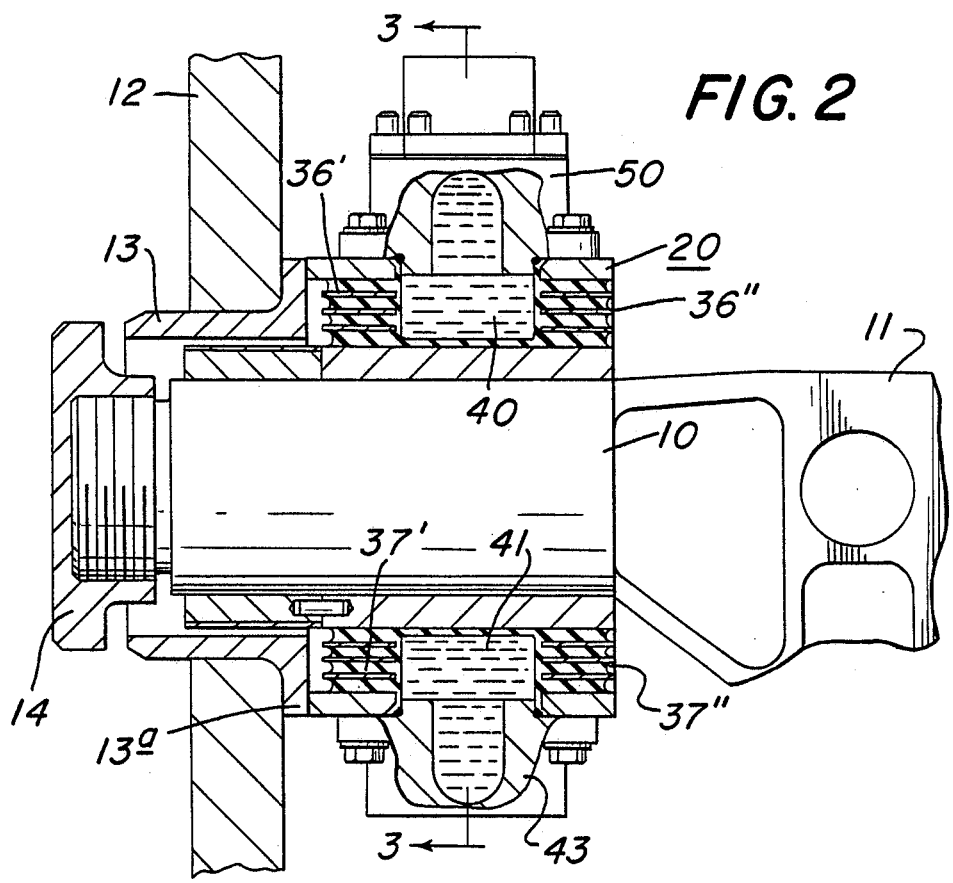
FIG. 2 is an enlarged longitudinal sectional view of the forward engine mount illustrated in FIG. 1.
Figure 3:
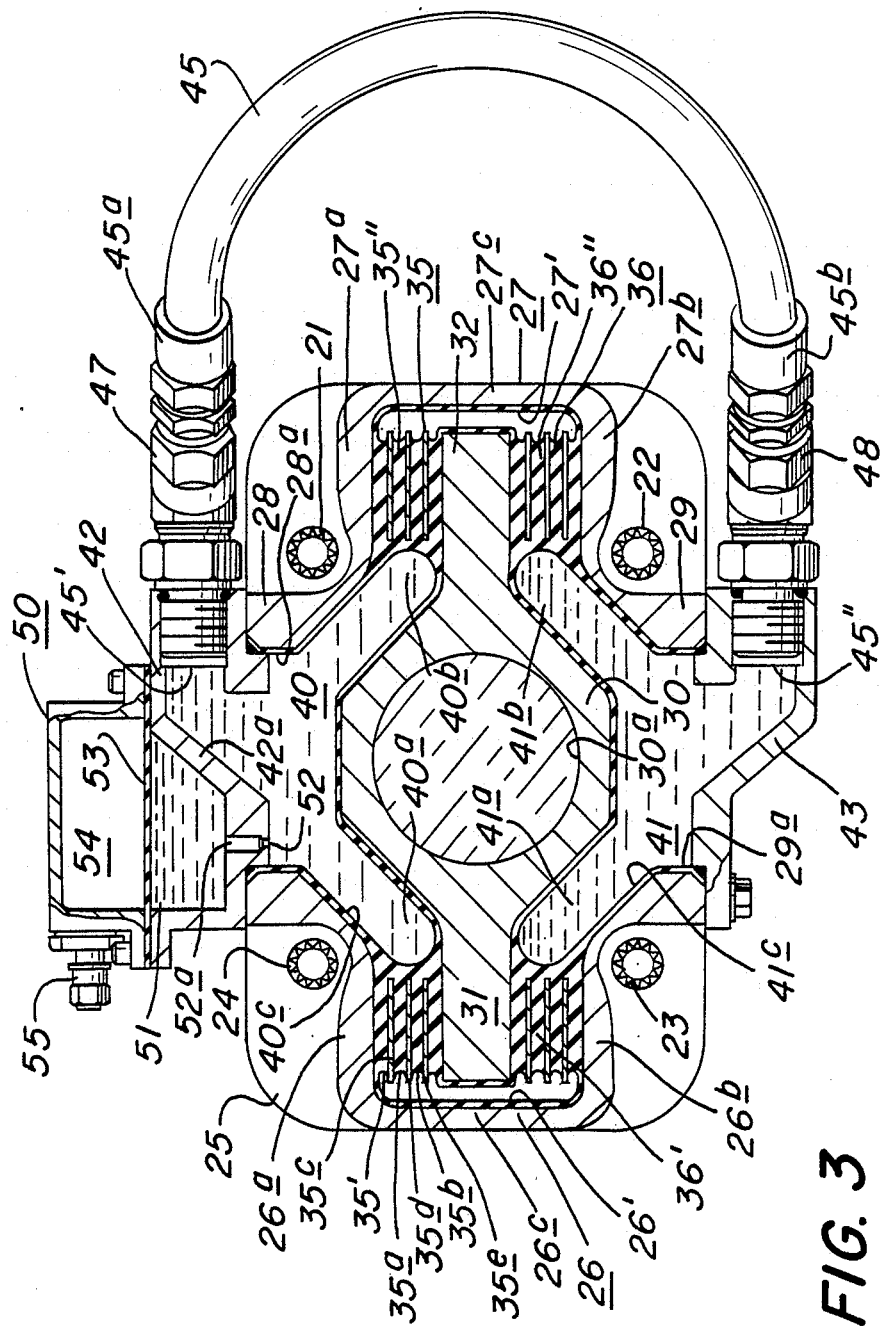
FIG. 3 is a transverse sectional view taken on line 3—3 of FIG. 2.

To this end, as best seen in FIG. 2, the fluid mount of the present invention includes a frame 20 which surrounds the wing pylon stub shaft 10 and which is fastened to the engine bulkhead bearing sleeve 13 by bolts 21, 22, 23 and 24. The bolts 21–24 pass through holes provided in a vertical front frame flange 25 that engages the aft surface 13a of the bearing sleeve 13. As best seen in FIG. 3, the frame 20 has a pair of U-shaped sidewalls 26 and 27 which extend rearwardly from the front flange 25 thereof and which provide recesses 26', 27', respectively that confront one another horizontally on diametrically opposite sides of the pylon stub shaft 10. The frame 20 also has a pair of upper and lower walls 28 and 29 which extend rearwardly from the front flange 25 integral with the sidewalls 26 and 27. The upper and lower walls 28 and 29 have formed therein openings 28a and 29a at the top and bottom of the frame 20.

To movably receive the stub shaft 10 within the frame 20, a support member 30 is provided. As best seen in FIG. 3, the support member 30 includes a bore 30a which slidably receives the stub shaft 10 and a pair of horizontal flanges 31 and 32 which extend diametrically laterally outward of the bore 30a into the opposed sidewall recesses 26' and 27'. Each sidewall, such as the left-hand sidewall 26, has an upper portion 26a and a lower portion 26b extending laterally inward of the frame flange 25 in spaced confronting relation on opposite sides of the left-hand flange 31 of the support member 30. The right-hand sidewall 27 has similar upper and lower portions 27a and 27b extending likewise with respect to the right-hand flange 32 of the support member 30. The sidewalls 26 and 27 have vertical portions 26c and 27c, extending across the ends of the support flanges 31 and 32, respectively.

The support member 30 is resiliently movably secured in the frame 20. For this purpose, a pair of laminated elastomeric elements 35 and 36 are provided between each support flange and its associated overlying and underlying portions of the frame sidewalls. As best seen in FIG. 3, a portion 35' of the upper laminated elastomeric element 35 is provided in the left-hand recess 26' between the topside of the left support member flange 31 and the underside of the upper left sidewall portion 26a, and a portion 35" of the laminated elastomeric elememt 35 is provided in the right-hand recess 27' between the topside of the support member flange 32 and the underside of the right sidewall portion 27a. The lower laminated elastomeric element 36 has similar portions 36', 36" likewise connecting the left and right hand member support flanges 31 and 32 in the frame recesses 26' and 27'.

As well known in the laminated elastomeric bearing art, as discussed more fully in the handbook entitled "High Capacity Laminate Design" published by Lord Corporation of Erie, Penna., the disclosure of which is incorporated by reference herein, each laminated elastomeric element, such as the laminated elastomeric element 35, includes a series of alternating layers of elastic and inelastic, or non-extensible, material, such as the rubber layers 35a, 35b, bonded to metal layers, or shims, 35c, 35d, 35e and to their associated confronting surfaces of the sidewall portions 26a and 26b and support flange 31 of the left-hand portion 35'. In the illustrated embodiment, the rubber and metal layers of the upper element 35 are integral and extend up and over the support member 30 at spaced fore and aft axial locations 36', 36" (FIG. 2) to form the upper fluid chamber 40. The rubber and metal layers of the lower element 36 have similar portions 37', 37" similarly arranged to form the lower fluid chamber 41. The laminated elastomeric elements 35 and 36 are designed primarily to carry static loads.

To provide the desired variable dynamic stiffness, the upper fluid chamber 40 and the lower fluid chamber 41 are located diametrically opposite one another above and below the stub shaft support member 30 and are filled with a relatively incompressible fluid. In the illustrated embodiment, the chambers 40 and 41 are defined by the rubber-lined interior surfaces of the support member 30, the elastomeric elements 35 and 36 and the upper and lower frame walls 28 and 29. An upper fitting 42 has a shaped wall 42a that closes the upper frame wall opening 28a and defines the upper end of the upper chamber 40, and a similar fitting 43 closes the lower frame wall opening 29a, and defines the lower end of the lower chamber 41. Fluid communication is provided between the upper chamber 40 and the lower chamber 41 by means of an elongate flexible hose, or tube, 45 connected at its upper end 45a to the upper fitting 42 by a releasable coupling 47 and connected at its lower end 45b to the lower fitting 43 by a releasable coupling 48. The upper and lower chambers 40 and 41 and the passage 45 therebetween form a primary fluid system. The tube 45 provides a fluid passage of a predetermined length and diameter which contains a fluid slug that resonates in response to alternate pressurization of the fluid chambers 40 and 41 under certain dynamic operating conditions. In the present instance, the mount is designed to have a relatively high vertical spring rate in the 1 to 40 Hertz frequency range and to have a lower vertical spring rate at about 60 Hertz.

In the embodiment illustrated, the chambers 40 and 41 form a fluid cradle on diametrically opposite sides of the stub shaft support member 30. To this end, each fluid chamber, such as the upper fluid chamber 40, has a pair of downwardly diverging leg portions 40a, 40b, and the lower chamber 41 has a like pair of upwardly diverging leg portions 41a, 41b. The leg portions of the chambers 40 and 41 extend into close proximity with the flanges 30 and 31 of the stub shaft support member 30 and thereby partially surround the upper and lower sides of the stub shaft support member 30. The continuous elastomeric liners 40c and 41c, molded in place during manufacture, ensure the fluid tightness of the upper and lower chambers 40 and 41, respectively.

When the stub shaft 10 and its support 30 are displaced downwardly relative to the frame 20, fluid in the lower chamber 41 is pressurized and forced via the elongate tube 45 into the upper chamber 40. In like manner, upward displacement of the stub shaft 10 and its support 30 pressurizes the fluid in the upper chamber 40 and forces it in the reverse direction through the elongate tube 45 into the lower chamber 41. Depending on the frequency of such alternating displacements, the fluid slug contained in the tube 45 oscillates and thereby varies the stiffness of the mount. For a more complete discussion of this phenomenon as it pertains to fluid mounts, reference is made to an article entitled "Understanding Hydraulic Mounts For Improved Vehicle Noise, Vibration and Ride Qualities" by Wallace C. Flower, SAE Technical Paper Series No. 850975, May 1985, the disclosure of which is incorporated by reference herein.

As used herein, and in the fluid mount art generally, the term volume stiffness expresses the relation of applied pressure (in pounds per square inch) to the volume of fluid (in cubic inches) displaced either from or into a chamber of variable volume as a result of the application of such pressure. In the present invention, the mount 20 is designed so that each fluid chamber in the primary fluid system has a relatively high volume stiffness, i.e. in excess of about 100 psi. per cubic inch (psi.-/in$^3$). The length of the fluid passage 45, measured between the locations 45', 45" where it opens into the upper and lower chambers 40 and 41, respectively, and the cross-sectional area of the passage 45, is selected to provide a minimum complex dynamic stiffness at about 60 Hertz. Preferably, in the illustrated embodiment, this is achieved by providing a tube 45 having a ratio of length "L" divided by cross-sectional area "a", or L/a ratio, of less than about 300 in combination with fluid chambers each having a volume stiffness in excess of about 100 psi./in$^3$. An advantage of the external disposition of the tube 45 and couplings 47 and 48 is that they permit the L/a ratio to be changed readily simply by disconnecting the couplings 47 and 48, removing the tube 45, and replacing it with a tube having a different L/a ratio. The units of the L/a ratio is per inch.

The upper and lower chambers 40 and 41 and their interconnecting passageway 45 are completely filled with an incompressible liquid, such as a liquid having a low freezing temperature and a low vapor pressure. While a water-glycol mixture can be used in some applications, preferably a silicone fluid, such as Dow Corning 200 (20 centistoke) manufactured by Dow Corning of Midland, Michigan, is used in the present aircraft engine mount because it has a higher flame point (in excess of about 450° F.) than a water-glycol liquid (below about 240° F.). Silicone fluid has a disadvantage, however, in that it has a relatively high coefficient of thermal expansion. Thus, depending upon the ambient temperature to which the mount 20 is subjected, the silicone fluid can change volume significantly. For instance, an increase in ambient temperature of as little as 1.0° F. can cause the fluid in the primary fluid system 40, 41 and 45 to expand and thereby to increase its pressure by about 5.0 psi. A decrease in ambient temperature can cause similar changes in primary fluid system pressures. Depending also on the level of absolute pressure in the primary fluid system, and the proclivity of certain fluids to migrate into and out of the elastomeric material forming the fluid-tight chambers 40 and 41, the volume of the fluid in the primary fluid system can either decrease, or increase, respectively, thereby also affecting mount performance.

The present invention solves the aforementioned fluid expansion and contraction problems. To this end, a compensator means is provided for accommodating the aforementioned changes in volume of fluid in the primary fluid system but without affecting the dynamic operating characteristics of the primary fluid system. In the present invention, these functions are performed by means of an auxiliary chamber 50 which provides a secondary fluid system having a volume stiffness which is significantly lower than the volume stiffness of either fluid chamber in the primary fluid system.

As best seen in FIG. 3, the auxiliary fluid chamber 50 is located adjacent to the upper fluid chamber 40 and includes a liquid-filled portion 51 which overlies the upper chamber 40 and is separated therefrom by the rigid upper chamber wall 42a. The liquid within the liquid-filled portion 51 of the auxiliary chamber 50 is in continuous fluid communication with the liquid in the upper chamber 40 through an orifice 52 extending vertically through the chamber wall 42a. The orifice 52 opens into the upper chamber 40 at a location remote from the opening 45' of the tube 45 thereinto. The portion 52a of the orifice 52 confronting the liquid-filled portion 51 of the auxiliary chamber 50 is enlarged to facilitate manufacture.

A movable member, in the present instance a flexible diaphragm 53, extends horizontally across the auxiliary chamber 50 and partitions the same into an upper gas-filled portion 54 that overlies the liquid-filled portion 51. Gas is charged into the upper gas-filled portion 54 of the auxiliary chamber 50 through a valve 55.

The volume stiffness of the secondary fluid system in the auxiliary chamber 50 is determined primarily by the pressure and volume of the gas in the upper portion 54 of the chamber 50. Preferably, this pressure is pre-set so that the volume stiffness of the secondary fluid system is less than about one-tenth the volume stiffess of either fluid chamber in the primary fluid system. The liquid-filled portion 51 of the auxiliary chamber is sized to provide a secondary fluid system volume which is about 20 percent of the volume of the primary fluid system, which in turn, in the illustrated embodiment is about one cubic inch. For one typical aircraft engine mounting application, the gas is pressurized before installation to about 80 psi. gauge.

In order to provide a frequency responsive means for isolating the secondary fluid system from the primary fluid system under certain operating conditions, the orifice 52 is of a predetermined configuration. Preferably, the natural frequency of the secondary fluid system is determined by the following formula: $f = \sqrt{K_v/I_f}$ wherein $K_v$ is the volume stiffness of the secondary fluid system (neglecting the diaphragm) and $I_f$ is the fluid inertia of the slug of fluid contained in the orifice 52. The natural frequency of the orifice fluid, $I_f$, is determined by the following formula: $I_f = \rho l/gA$, wherein $\rho$ is the density of the fluid, 1 is the length of the orifice 52, g is the gravitational acceleration constant, and A is the cross-sectional area of the orifice 52.

The orifice 52 is sized such that the secondary fluid system natural frequency is below that of the primary fluid system and suth that there is a substantial resistance to fluid flow through the orifice. As a result, during operation of the mount at frequencies above about 10 Hertz, the fluid slug in the orifice 52 resonates, thereby locking out the secondary fluid system from the primary fluid system, so that these frequencies, only the primary fluid system is operatively effective in the mount 20. Also because the inertia of the fluid in the secondary fluid system is relatively small, and the resistance to fluid flow through the orifice is large, the effect of the secondary fluid system on the overall spring rate of the mount is negligible.

From the foregoing, it should be apparent that the present invention now provides an improved fluid mount which is particularly suited for mounting engines in aircraft because it solves the motion, nose and ambient operation problems associated with aircraft engine mounts.

While a preferred embodiment of the present invention has been described in detail, various modifications, alterations and changes may be made without departing from the spirit and scope of the present invention as defined in the appended claims.

I claim:

1. In a fluid mount including a frame adapted to be fastened to a first structure, means providing in said frame opposed separate variable volume liquid-filled working chambers, means located between said working chamber for receiving a second structure movable relative to the frame, each of said chambers having a movable wall portion displaceable in response to movement of said receiving means for pressurizing the liquid contained therein and providing a predetermined volume stiffness, and passage means providing fluid communication between said working chambers for cooperating therewith to define a primary fluid system having predetermined dynamic characteristics, the improvement comprising: means providing an auxiliary chamber containing a quantity of liquid and defining a secondary fluid system, and orifice means providing fluid communication between said secondary fluid system in said auxiliary chamber and said primary fluid system for accommodating variations in the volume of fluid in said primary fluid system, said auxiliary chamber providing said secondary fluid system with a volume stiffness which is lower than the volume stiffness of said primary fluid system, said orifice between said primary and secondary fluid systems cooperable therewith to isolate dynamically the fluid in the secondary fluid system from the fluid in the primary fluid system at predetermined operating frequencies while accommodating said variations in the volume of the fluid in the primary fluid system.

2. A fluid mount according to claim 1 wherein said orifice means confines a slug of fluid between said primary and secondary fluid systems and has a relatively high resistance to fluid flow therebetween.

3. A fluid mount according to claim 2 wherein the volume stiffness of said secondary fluid system is less than about one-tenth the volume stiffness of each working chamber of the primary fluid system.

4. A fluid mount according to claim 3 wherein the volume stiffness of each chamber in the primary fluid system is greater than about 100 psi. per cubic inch.

5. A fluid mount according to claim 4 wherein said predetermined frequencies are greater than about 10 Hertz.

6. A fluid mount according to claim 1 wherein said passage means includes an elongate tube connecting said opposed chambers external of said frame, and including coupling means releasably connecting said tube at opposite ends to said chambers.

7. A fluid mount according to claim 1 wherein said auxiliary chamber is located adjacent to one of said opposed chambers and is separated therefrom by a rigid wall carried by said frame, and said orifice means passes through said rigid wall to provide said fluid communication between said primary and secondary fluid systems.

8. A fluid mount according to claim 1 including a movable means dividing said auxiliary chamber into a liquid-filled portion containing said secondary fluid system and a gas-filled portion in said auxiliary chamber on the side of the movable means opposite the liquid-filled portion thereof.

9. A fluid mount according to claim 8 including valve means providing gas communication to said gas-filled portion of said auxiliary chamber for charging with gas at a pressure level which determines the volume stiffness of said secondary fluid system.

10. In an aircraft having a stub shaft for mounting an engine thereon, a fluid mount connected between said stub shaft and said engine, said fluid mount comprising:
a frame secured to said engine,
means movably carried by said frame for receiving said stub shaft,
flexible means mounting said shaft receiving means in said frame and cooperating therewith to provide opposed variable volume working liquid-filled chambers on diametrically opposite sides of said shaft receiving means,
passage means providing fluid communication in an elongate flow path between said opposed chambers for cooperating with said opposed chambers to define a primary fluid system in which each of said opposed chambers has a predetermined volume stiffness,
means providing an auxilary chamber carried by said frame and defining a secondary fluid system,
orifice means providing fluid communication between said primary and secondary fluid systems,
movable means dividing said auxiliary chamber into a liquid-filled portion in communication with said orifice means and a gas-filled portion providing said secondary fluid system with a lower volume stiffness than the volume stiffness of either of said opposed chambers, and
means including said orifice means operable to isolate dynamically the secondary fluid system from the primary fluid system above predetermined frequencies while accommodating changes in the volume of the liquid in the primary fluid system.

11. An aircraft engine mounting system according to claim 10 wherein said orifice confines a slug of fluid of a predetermined length and cross-sectional area which is of a volume significantly smaller than the volume of any of said chambers.

12. An aircraft engine mounting system according to claim 10 wherein said flexible means includes laminated elastomeric elements engaged between said frame and opposite upper and lower sides of said shaft receiving means for resiliently securing said shaft in said frame.

13. An aircraft engine mounting system according to claim 10 wherein said shaft receiving means includes a support member having a pair of flanges extending laterally thereof, and wherein said flexible means includes a pair of laminated elastomeric elements engaged between upper and lower sides of said flanges and said frame for mounting said shaft support member for resilient movement in a vertical direction.

14. An aircraft engine mounting system according to claim 10 wherein said liquid-filled chambers each have portions cradling said stub shaft receiving means.

15. An aircraft engine mounting system according to claim 10 wherein said passage means includes a flexible tube extending externally of said frame, and coupling means releasably connecting said tube at opposite ends thereof to said working fluid chambers.

16. An aircraft engine mounting system according to claim 10 wherein said auxiliary chamber overlies the upper one of said working fluid chambers, said passage means opens laterally into said upper chamber, and said orifice means extends between said auxiliary and upper working chambers at a location remote from where said passage means opens into said upper working chamber.

17. A fluid mount, comprising:
a frame adapted to be secured to a first structure,
support means movable within said frame for receiving therewithin at least a portion of a second structure,
laminated elastomeric element means engaged between said frame and said support means for mounting said support means and thereby said second structure for resilient oscillating motion in at least a vertical direction relative to said frame,
liquid-tight means carried within said frame means for defining an opposite sides of said support means a pair of separate variable volume chambers for containing a working liquid,
elongate passage means for providing fluid communications between said opposed variable volume chambers and cooperating therewith to define a primary fluid system,
means providing an auxiliary chamber adjacent to at least one of said working fluid chambers,
orifice means providing fluid communication between said one working fluid chamber and said auxiliary chamber,
diaphragm means in said auxiliary chamber separating the same into a liquid-filled portion in communication with said orifice means and a gas-filled portion on the side thereof opposite said liquid-filled portion, said diaphragm means cooperable with said liquid and said gas in said auxiliary chamber to provide a secondary fluid system having a volume stiffness which is lower than the volume stiffness of either of said working fluid chambers,
said orifice means being of a predetermined configuration for confining between said primary and secondary fluid systems a slug of fluid of a predetermined configuration for resonating and thereby isolating said primary and secondary fluid systems above a predetermined frequency of oscillation of said support means relative to said frame while accommodating changes in the volume of the liquid in the primary fluid system.

18. A fluid mount according to claim 17 wherein the volume stiffness of each working fluid chamber in said primary fluid system is at least about 100 psi. per cubic inch, said volume stiffness of said secondary fluid system is less than about one-tenth said working chamber volume stiffness, and said slug of fluid defined by said orifice means provides an effective fluid mass sufficient to cause the fluid systems to be isolated from one another at frequencies of oscillation greater than about 10 Hertz.

19. A fluid mount according to claim 17 wherein said support means includes a support member having a bore and a pair of flanges each having upper and lower sides extending laterally outward therefrom, wherein said frame includes a pair of opposed recesses for receiving said flanges with a clearance thereabout, and wherein said laminated elastomeric element means includes elastic and inelastic lamination engaged between said upper and lower flange surfaces for mounting said support member for vertical motion in said frame.

20. A fluid mount according to claim 17 wherein each of opposed working fluid chambers at least partially surrounds said support means for cooperating therewith to cradle said support means therebetween, wherein said auxiliary chamber is located adjacent to one of said working fluid chambers, and wherein said passage means includes an elongate tube connecting said opposed working fluid chambers externally of said frame.

* * * * *